United States Patent [19]

Hughes et al.

[11] Patent Number: 4,613,164

[45] Date of Patent: Sep. 23, 1986

[54] MISALIGNMENT TIEBACK TOOL - ROTATING CASING

[75] Inventors: David W. Hughes; Lionel J. Milberger, both of Houston, Tex.

[73] Assignee: Vetco Offshore Industries, Inc., Ventura, Calif.

[21] Appl. No.: 659,603

[22] Filed: Oct. 12, 1984

[51] Int. Cl.$^4$ .............................................. F16L 21/00
[52] U.S. Cl. ................................ 285/27; 285/377; 166/242; 166/380
[58] Field of Search ................. 285/27, 377, 362, 361, 285/396, 402, 89; 166/242, 380, 345

[56] References Cited

U.S. PATENT DOCUMENTS

| | | | |
|---|---|---|---|
| 193,810 | 8/1877 | Eccleston | 285/377 |
| 2,107,165 | 2/1938 | Rice | 285/402 |
| 3,322,443 | 5/1967 | Brown | 285/361 X |
| 3,604,730 | 9/1971 | Carroll et al. | 285/27 |
| 4,330,140 | 5/1982 | Hampton | 285/377 X |
| 4,343,495 | 8/1982 | Nobileau et al. | 285/39 X |

FOREIGN PATENT DOCUMENTS 2541127 11/1976 Fed. Rep. of Germany ...... 285/377

Primary Examiner—Thomas F. Callaghan
Attorney, Agent, or Firm—Joseph R. Dwyer

[57] ABSTRACT

A tieback tool (10) and method for connecting tieback conductors (12) to a well system (14) where misalignment occurs between the tool and the well system including a body (40) having an externally threaded dog ring (44) which engages the throats of J-slots (34) in the well system and which initially serves to align the tieback tool to the well system. Rotation of the tieback tool after initial alignment actuates the threaded dog ring (44) in the tieback tool to lock and seal the tieback tool into the well system.

9 Claims, 12 Drawing Figures

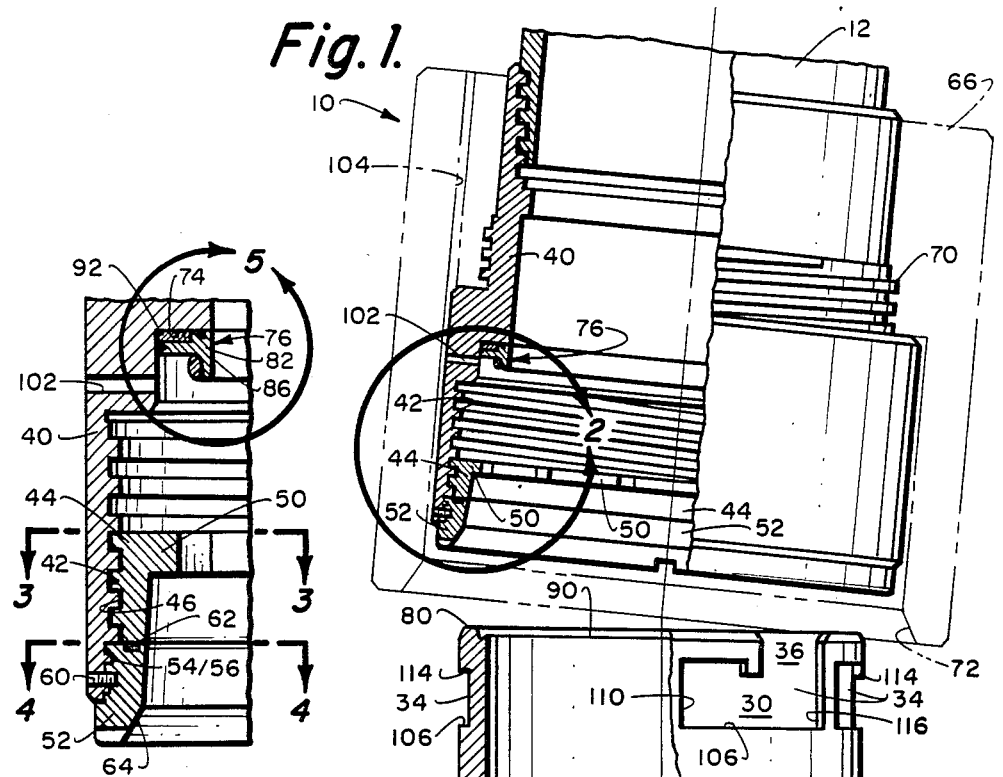
Fig. 1.
Fig. 2.
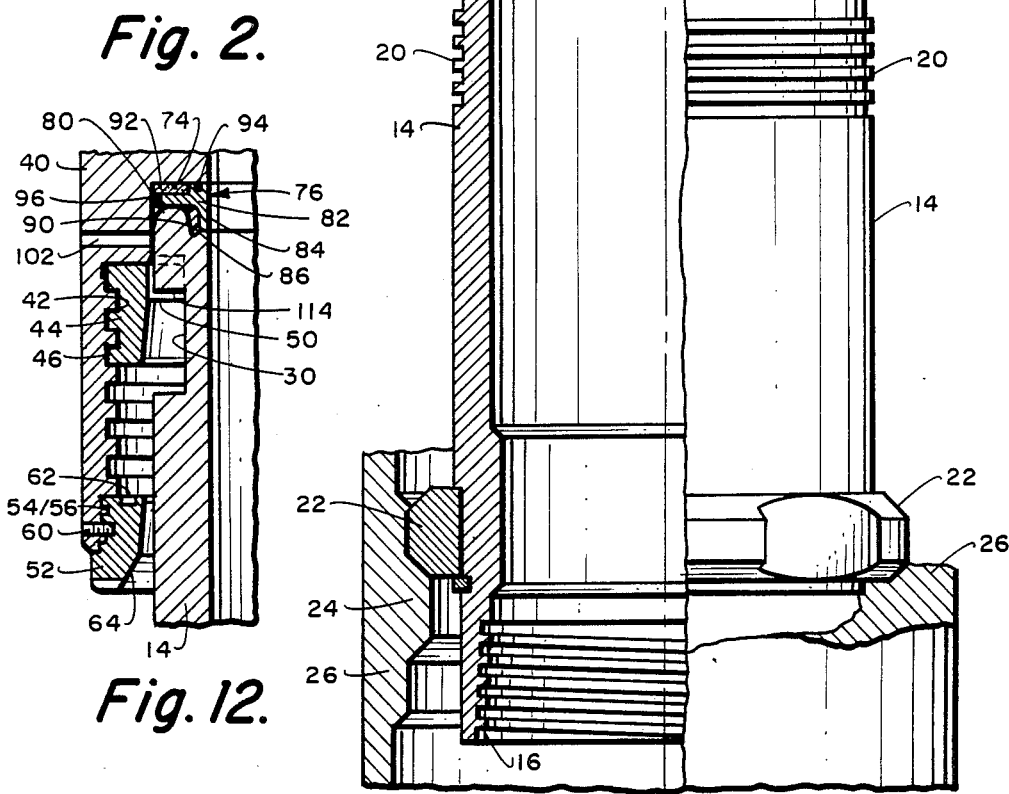
Fig. 12.

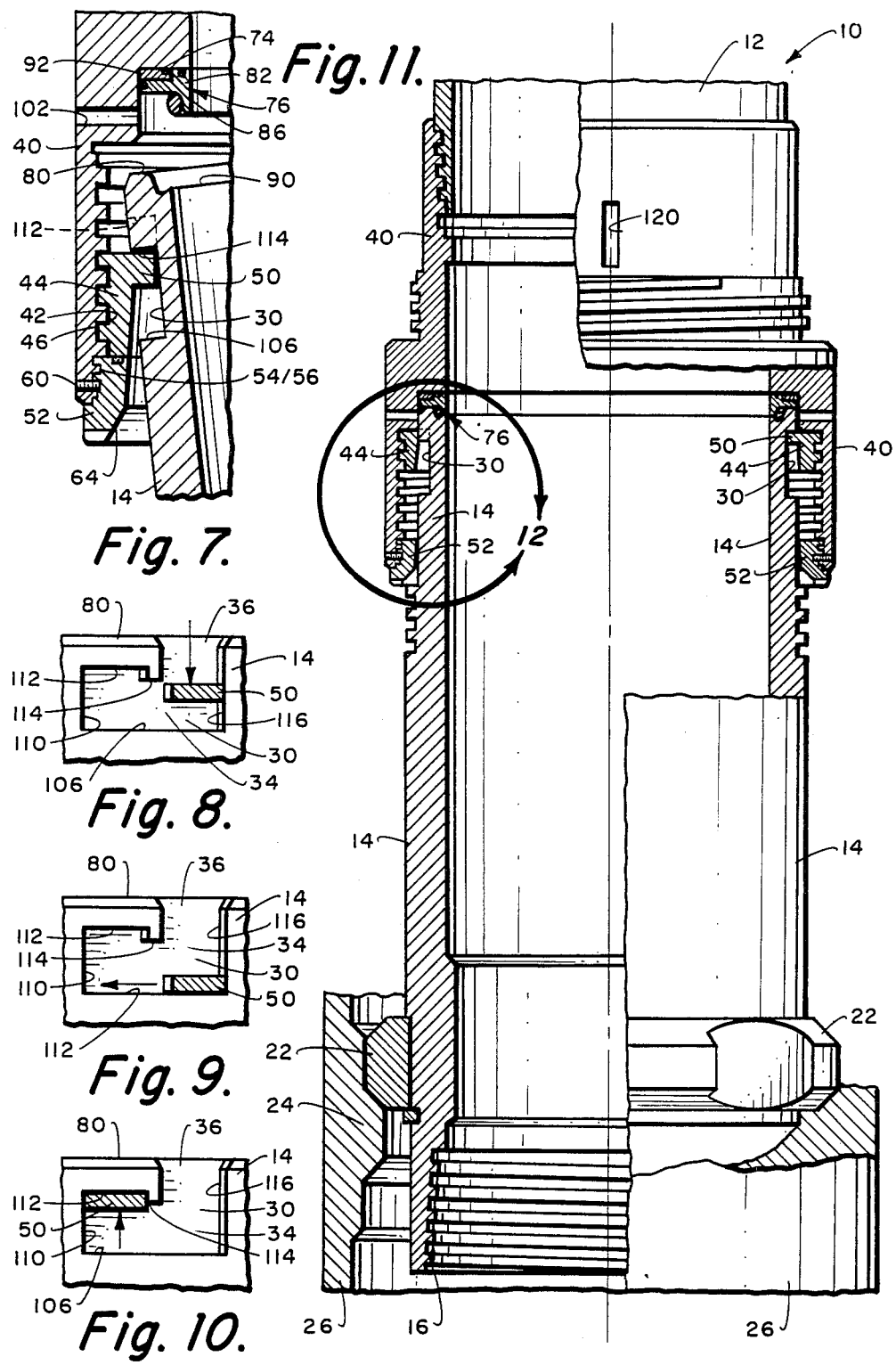

MISALIGNMENT TIEBACK TOOL - ROTATING CASING

RELATED APPLICATION

U.S. application Ser. No. 659,605 filed Oct. 12, 1984 by David W. Hughes for MISALIGNMENT TIEBACK TOOL NON-ROTATING CASING.

BACKGROUND OF THE INVENTION

This invention relates to offshore oil production apparatus and, in particular, to a tieback tool and method for connecting a tieback conductor (also referred to as tieback casing) to a subsea well.

Offshore oil wells may be drilled from a drilling vessel or rig and thereafter produced to a fixed platform. Typically, once a well is drilled to depth, it is plugged, a protective cap installed and the drilling vessel moved to another well location. The fixed platform is then moved to a position over the well, the cap removed and tieback conductors are run from the platform deck to the well. Tubing is then run, production trees installed, and the well produced in the conventional manner.

A complication comes about, however, because it is nearly impossible to align the fixed platform precisely over the well system and although the tieback conductor string runs through the guides at various elevations, offset still occurs and the problem is particularly acute where there is angular misalignment in the vicinity of the well system where the tieback conductor is to be joined to the well.

Funnels have been used in tieback tools to overcome the alignment problem and prevent damage to threads either in the well system or in the tool as they were being engaged as shown, for example, in U.S. Pat. Nos. 4,343,495 and 4,408,782. These funnels aligned the tool with the well system prior to engagement of the mating threads. After alignment, additional tools were used to thread the tieback tool into the system and to activate the seals therein. Even with such a funnel and additional tools, the existing tieback tools cannot be engaged if there is large angular misalignment in excess of 2° and attempts to make up the joint with such misalignment resulted in improperly loaded threads and galling thereof.

SUMMARY OF INVENTION

The tieback tool and method for connecting tieback conductors to the well system, in this case a mudline casing hanger, which overcomes the aforesaid problem of misalignment includes a body which is internally threaded to receive a ring having dogs for engagement with J-slots in the casing hanger. The throats of the J-slots are wide enough to compensate for misalignment of the tool relative to the casing hanger as the tool approaches the well by allowing entry of some of the dogs in the initial stabbing of the tool to the casing hanger which then directs the remaining dogs into their respective J-slots for final connection of the tool to the hanger.

The tool itself also has a top ring which acts as a tapered guide in the initial stabbing and also incorporates the means for insuring full engagement in the J-slots by the dogs prior to the initial rotation of the dog ring on a tool body to lock the dogs in the J-slots, to clamp the tieback tool in precise alignment with the casing hanger, and to compress the seal between the tool and casing hanger.

As will be apparent to those skilled in the art, that since it is the dogs and the J-slots which make the connection between the tool and the casing hanger, that since the threads on the tool body and ring are used only after the connection is made, and that since there is never any disengagement of the threads, reliance on the ability to make a thread connection with mating threads, at the time the tool is connected into the system, is eliminated. Too, since the threads are on the tool and not in the well system, the threads can be retrieved if they become damaged.

In this invention, the tieback conductor string is rotated to connect and disconnect the tieback tool to and from the casing hanger, whereas in the invention of the Hughes application, supra, the tieback conductor string is not rotated to connect and disconnect the tieback tool to and from the casing hanger, but both utilize the concept of J-slots and a threaded ring in the tieback tool to align and lock the tool on the casing hanger.

It should also be apparent that while this is called a tieback tool, it also could be used as a running tool where J-slots are used in the well system.

BRIEF DESCRIPTION OF DRAWINGS

FIG. 1 illustrates the tieback tool in angular misalignment with the casing hanger as the tieback tool approaches the well, FIG. 2 is an enlarged detailed cross-sectional view showing the retainer ring and dog ring threaded in the tool, FIG. 7 is an enlargement of part of FIG. 6 to show more detail, FIG. 8 is a schematic illustration of one dog entering a J-slot approximately as in FIG. 7, FIG. 9 illustrates the dog resting on the bottom of the J-slot as the tool is in alignment with the casing hanger, FIG. 10 illustrates the dog engaging the top of the J-slot in locked position, and FIGS. 11 and 12 illustrate the tieback tool fully connected to the casing hanger and showing the relationship between the dog ring, J-slot and the seal between the tieback tool and the casing hanger.

DETAILED DESCRIPTION

Figure 3:
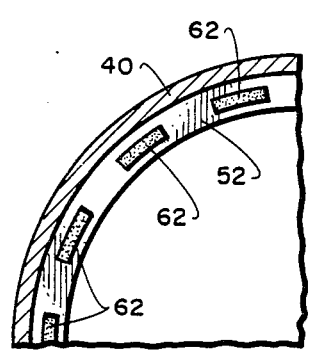
FIG. 3 is a plan view of the part of the dog ring of FIG. 1, taken along line 3—3 of FIG. 2.

In the drawings, particularly with reference to FIGS. 1 and 2, it can be seen that tieback tool 10 is rigidly connected and sealed to the lower end of one external tieback conductor (pipe) 12 which is to be connected and sealed onto a casing hanger 14. Tieback conductor 12 is the lower one of a string of conductors which are anchored to the platform and put in tension. Casing hanger 14 was previously installed and casing (not shown) is connected as by tapered threads 16 on its lower end.

Also, prior to the approach of the tieback tool as shown in FIG. 1, a protective cap, threaded on external threads 20 on the casing hanger, was removed.

The previously installed casing hanger 14 is shown with its external landing ring 22 engaging a landing profile 24 on an outer casing hanger 26. Only the landing area of the outer casing hanger 26 is shown in FIG. 1. Typically, casing hanger 26 is a 30 inch hanger connected to 30 inch casing cemented in a previously drilled hole. Casing hanger 14 supports other casing (not shown) also cemented in a previously drilled hole as well as other casing hangers yet to be installed.

The top of the casing hanger 14 is provided with a plurality of J-slots 34 (only a few such slots in the embodiment shown), which have throats 36 wide enough to allow for large angular misalignment between the casing hanger and the tieback tool 10. See also FIGS. 8, 9, and 12 which show the J-slots clearly in elevation.

Figure 4:
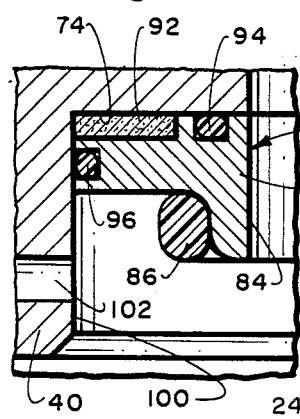
FIG. 4 is a plan view of part of the retainer ring taken along line 4—4 of FIG. 2.

The tieback tool itself comprises a cylindrical outer cup-like body 40 with a throat having internal square threads 42 to receive a dog ring 44 which has mating threads 46 on its outer diameter (FIG. 2). The dog ring is relatively narrow and has a lesser number of threads than the tool body and is provided with radially inwardly extending dogs 50 for engagement with the throats 36 of the J-slots in the casing hanger. The dog ring 44 is retained within the tool body by a retainer ring 52 suitably affixed to the end of the tool body by mating threads 54, 56 and prevented from rotating by set screws 60 (one shown) after the ring is threaded into the body 40. The top surface of the retainer ring has a plurality of pads 62 of friction material, such as crushed tungsten carbide particles, sweated on the surface, as shown in FIG. 4. When the dog ring is engaging the retainer, as shown in FIG. 2, these pads 62 hold the dog ring against rotation until the appropriate time in the operation of the tool as will be clear hereinafter. Retainer ring 52 has a conical inner surface 64 which forms a tapered guide which presents a diameter larger than the diameter of the casing hanger to aid in stabbing the tieback tool on to the hanger. If additional guidance is thought necessary, an optional funnel 66, placed over the tool body 40 and threaded onto external threads 70 on the tool body, may be used. The funnel extends downwardly beyond the lower end of the tool body and also has a conical or tapered surface 72 which acts as a guide for stabbing the tool onto the casing hanger.

Figure 5:
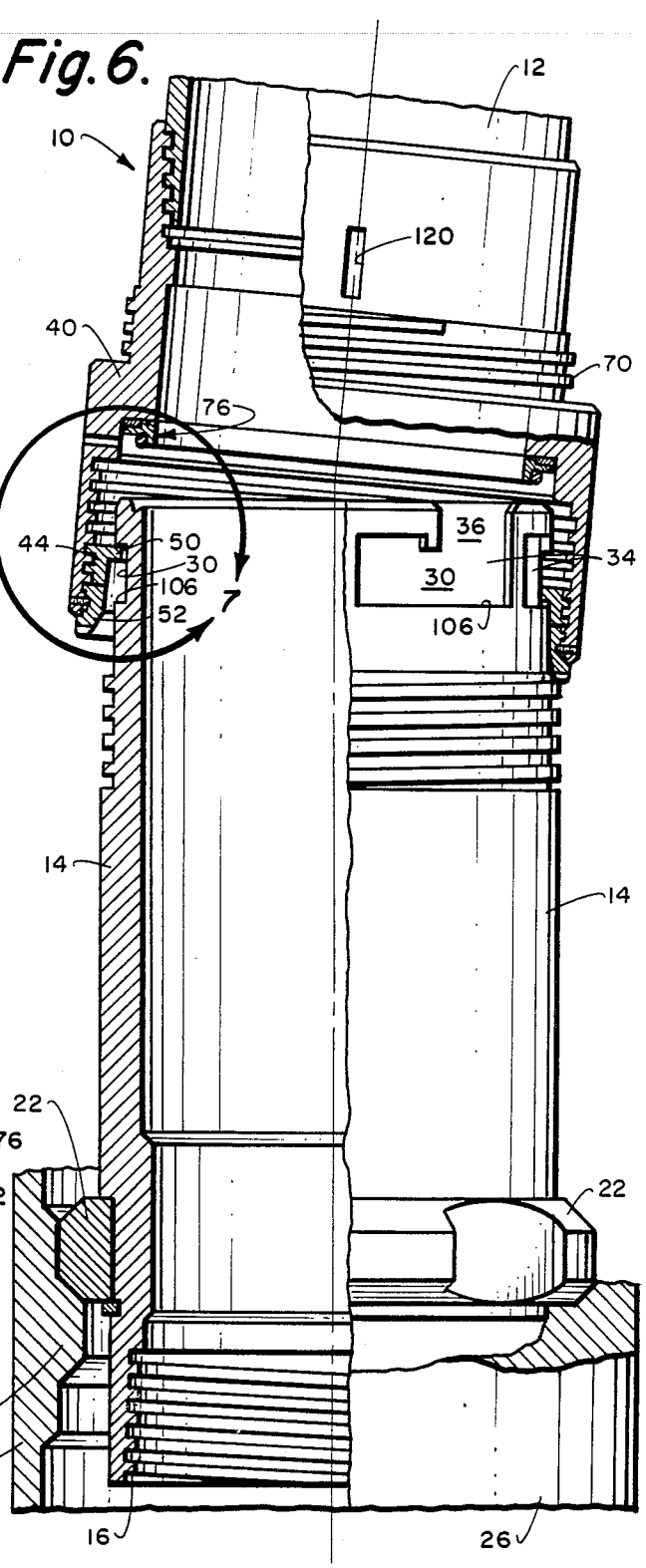
FIG. 5 is a cross sectioned view of the seal assembly enlarged over that shown in FIG. 2 for clarity of detail.

The tool body is provided with a downwardly facing surface or ledge 74 (more clearly shown in FIG. 2), which extends radially inwardly and above the end of the threads 42. This surface 74 forms a seat for sealing assembly 76 (shown in more detail in FIG. 5). As will become clear from the following description of the remaining figures, the top edge 80 of the casing hanger will squeeze the sealing assembly 76 when the tool is fully connected to form a liquid tight seal between the tool and the hanger. This seal assembly 76 itself comprises a metallic seal holder ring 82 with a downwardly extending tip 84 to which is molded a relatively large rubber seal ring 86 which actually engages the top edge 80 and recess 90 of the casing hanger and is squeezed against the ring tip 84. As shown in FIGS. 10 and 11, the tip 84 telescopes within the top edge of casing hanger. The seal holder ring 82 is grooved in its top surface to contain a bearing ring 92 of the Teflon type material, such as Turcite, and a rubber O-ring 94 is molded in a suitable groove on the top surface radially inwardly of the bearing ring 92, nearer the central axis of the tool, to engage the ledge 74. The assembly is held in place by the frictional resistance of another O-ring seal 96 located in a suitable groove on the radially outer surface of the ring adjacent the tool body wall 100. This latter wall is slightly undercut to provide more frictional resistance as the ring assembly is fitted in place on the tool body. Also, between the top of the threads 42 and the sealing assembly 76 are a plurality of radially vented wash ports 102 which are openable externally of the casing hanger and tool by backing off the threaded dog ring a few turns. A passage 104 is also provided between the outer surface of the tool body and the inner surface of the optional funnel 66 (or through the funnel as shown) to vent the wash parts when the funnel is used.

Figure 6:
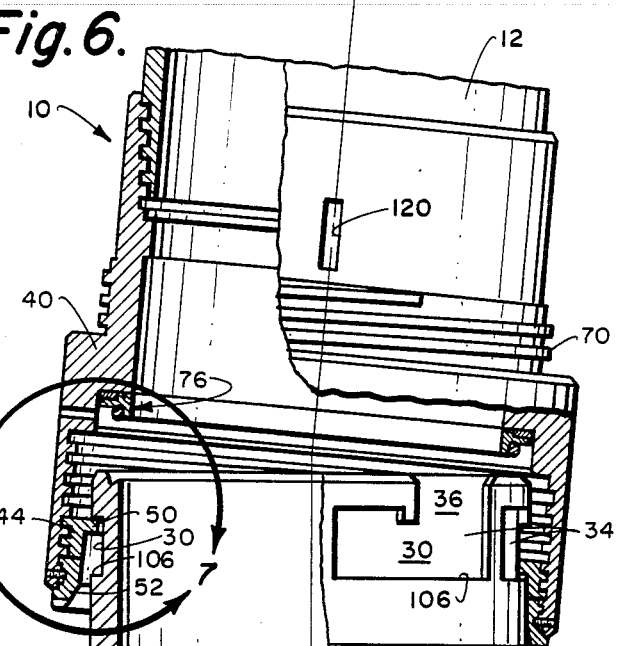
FIG. 6 is a next stage in the connection of the tieback tool to the casing hanger showing the initial engagement of some of the dogs in the J-slots of the casing hanger.

Turning now to FIGS. 6–8, where the tieback tool 10 is shown initially stabbed onto the casing hanger 14. In this stage, center line of the tool is still misaligned with respect to the center line of the well system, such as in FIG. 1, but many of the dogs 50 have entered throats 36 of the J-slots and have come to rest on the bottom surface 106 thereof. The remainder of the dogs 50 are above, or have just entered, the throats 36 as shown more clearly in FIG. 8. FIG. 8 also shows that the width of the throats 36 and the width of the dogs 50 facilitate entry of the dogs as mentioned supra. (The tool was rotated slightly counterclockwise as viewed from the platform, if the dogs happened to have landed on the top of the casing hanger between the throats.)

With the orientation of the tool by the operation of the dogs and throats, continued downward movement of the tool will cause the remainder of the dogs to come to rest on the bottom surfaces 106 of the J-slots. See FIG. 9 where one of the dogs is shown at the bottom of the J-slot. At this time the tool is aligned with the casing hanger.

Continued rotation of the tool will move all the dogs to the left as viewed in the drawings where they will engage the left walls or surfaces 110 of the J-slots. At this time, continued rotation of the tool will cause the dog ring to overcome the friction of friction pads 62 on the top of the retainer ring 64 and the dog ring 44 will then move upwardly into the tool body in response to the action of the threads 42 and 46 until the dogs 50 engage the upper surfaces 112 of the J-slots. (See FIG. 10).

FIG. 11 and FIG. 12 both show the joint fully made up with the dogs in their upper most position and with the top 80 of the casing squeezing the sealing assembly 76 to form the leak proof seal between the tool and the casing hanger.

Retrieval of the tool is simply the reverse of the making up the connection. The tool is rotated counterclockwise. The dogs will initially engage the locking tabs 114 of the J-slots, as shown in FIG. 10, but the continued action of the threads will cause the dogs to bypass these locking tabs and engage the right hand wall 116 of the J-slots until the locking ring has re-engaged the retainer ring at this time the dogs will be aligned with the throats of the J-slots to permit upward movement of the tool free of the casing hanger.

Thus, the foregoing discloses a tool having a threaded lockdown means which not only is used to overcome any misalignment between the tool and the well system, but also is used to lock the tool onto the system with little danger of thread damage.

Finally, if desired, a torquing tool (not shown) may be run inside the tieback tool and engage vertical slots or grooves 120 in the tool. The grooves would, of course, be located so as not to interfere with threads interacting with the threads in the tieback conductor 12.

We claim:

1. A tieback tool for connecting a tieback conductor to a subsea well system comprising;
   a hollow tubular body member connected to the tieback conductor,
   a lockdown and aligning means on said tubular body member for aligning and locking said tool on said well system, including
   ring means threadably engaged to said tool body member and itself having radially inwardly extending ring locking means adapted to engage one or more locking means on said well system upon initial engagement of said tubular body member with said well system to commence the process of alignment of said tool with said well system by resting on a bottom surface of said well system locking means and thereafter engage all said ring locking means and thus aligning said tool with said well system,
   both said locking means thereafter functioning to rotate said ring means to lock said tool onto said well system by raising said ring locking means within said well system locking means by rotation of said tieback conductor.

2. The tieback tool as claimed in claim 1 wherein said ring locking means comprises of radially inwardly extending dogs, wherein the locking means on said well system comprises J-slots with throats opening upwardly towards said tool and wherein said dogs rest on the bottom surface of such J-slots when said tool is aligned with such well system and are raised to engage top surface of said J-slots by upward movement of said ring means.

3. The tieback tool as claimed in claim 2 wherein said tool further has means for retaining said ring means in its initial position during initial engagement and alignment of said tool and well system and which is thereafter deactivated as said dogs are moved within said J-slots by movement of said tool.

4. The tieback tool as claimed in claim 3 wherein said well system includes a casing hanger and said J-slots are located in said casing hanger.

5. The tieback tool as claimed in claim 4 wherein said ring means further includes a conically tapered surface to aid in stabbing said tool onto said well system.

6. The tieback tool as claimed in claim 5 wherein said tieback tool includes additional guide means to further aid in stabbing said tool onto said well system.

7. The tieback tool as claimed in claim 6 further including sealing means in said tool body member engagable by said well system when said tieback tool is locked into said well system to form a fluid tight seal between the tool and the said well system.

8. In a subsea well system, a method for connecting tieback conductors between the subsea well and a surface assembly comprising the steps of:
   providing the subsea well with a plurality of well locking means,
   providing a tieback tool on one end of a string of tieback conductors,
   said tieback tool including ring means threadedly engaged to said tieback tool and itself having a plurality of radially inwardly extending ring locking means,
   initially engaging some of the ring locking means with some of the well locking means, thereby initially aligning the tieback tool with the subsea well and aligning the remainder of the ring locking means with the well locking means,
   lowering said tool until all of said ring locking means are fully received in said well locking means thereby aligning the tool with said well system,
   rotating said tool to raise said ring locking means with said well locking means to lock said tool onto said well and to form a fluid tight seal between said tieback tool and said well.

9. A tieback tool for connecting a tieback conductor to a subsea well system, said tool having an opening which telescopes over a tubular member of said well system, said tool comprising:
   a hollow tubular body member connected to the tieback conductor,
   combined lockdown and aligning means on said tubular body member for aligning and locking said tool on said well system, said combined lockdown and aligning means comprising:
   a ring threadably received in said tubular body member and rotatable away from said opening,
   a plurality of locking dogs on said ring and extending radially inwardly, and
   said tubular member having J-slots with throats opening upwardly to receive said dogs, and further having bottom surfaces, top surfaces, and locking tabs between said throats and said top surfaces,
   said dogs and J-slots being arranged so that at least one dog enters one of said throats and comes to rest on one of said bottom surfaces, whether or not said tubular body member and said tubular member are aligned coaxially, and so that each of the remainder of said dogs enter the remainder of said throats and come to rest on the remainder of said bottom surfaces, and so that movement of said ring away from said opening locks said radially extending dogs in said J-slots by lifting each said dog toward each said top surface on the side of said locking tabs away from said throats, thereby locking said dogs in said J-slots and sealing means on said tubular body member and engageable with the top of said tubular member when said ring rotates away from said opening, whereupon said sealing means engages the top of said tubular member to seal said tool onto said well system.

* * * * *